United States Patent
McCombs

(10) Patent No.: US 6,665,773 B1
(45) Date of Patent: Dec. 16, 2003

(54) SIMPLE AND SCALABLE RAID XOR ASSIST LOGIC WITH OVERLAPPED OPERATIONS

(75) Inventor: Craig C. McCombs, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 235 days.

(21) Appl. No.: 09/784,548

(22) Filed: Feb. 15, 2001

Related U.S. Application Data

(63) Continuation-in-part of application No. 09/748,597, filed on Dec. 26, 2000.

(51) Int. Cl.[7] .............................................. G06F 12/00
(52) U.S. Cl. ..................................................... 711/114
(58) Field of Search .......................................... 711/114

(56) References Cited

U.S. PATENT DOCUMENTS

| | | | | |
|---|---|---|---|---|
| 5,867,723 A | * | 2/1999 | Chin et al. ..................... 712/11 |
| 5,946,707 A | * | 8/1999 | Krakirian ..................... 711/112 |
| 5,996,046 A | * | 11/1999 | Yagisawa et al. ........... 711/114 |
| 6,112,255 A | * | 8/2000 | Dunn et al. ..................... 710/7 |
| 6,161,165 A | * | 12/2000 | Solomon et al. ............. 711/114 |
| 6,370,616 B1 | * | 4/2002 | Callison et al. .............. 711/114 |

* cited by examiner

Primary Examiner—Matthew Kim
Assistant Examiner—Woo H. Choi
(74) Attorney, Agent, or Firm—Suiter West PC LLO

(57) ABSTRACT

The present invention is directed to a simple and scalable RAID XOR assist logic with overlapped operations. An apparatus suitable for performing overlapped operations may include an exclusive OR (XOR) unit suitable for performing an exclusive OR (XOR) operation. A memory communicatively coupled to the XOR unit, wherein the memory is suitable for storing a first item of data and a second item of data thereby enabling overlapped operations of the exclusive OR (XOR) unit.

23 Claims, 3 Drawing Sheets

SIMPLE AND SCALABLE RAID XOR ASSIST LOGIC WITH OVERLAPPED OPERATIONS

CROSS REFERENCE TO RELATED APPLICATION

The present invention is a Continuation-in-Part of U.S. patent application Ser. No. 09/748,597, SIMPLE AND SCALABLE RAID XOR ASSIST LOGIC WITH OVERLAPPED OPERATIONS, filed Dec. 26, 2000, pending, which is herein incorporated by reference in its entirety.

FIELD OF THE INVENTION

The present invention generally relates to the field of RAID devices, and particularly to a simple and scalable RAID XOR assist logic with overlapped operations.

BACKGROUND OF THE INVENTION

The efficient and precise storage of computer information is one of the most important considerations of the modern economy. From web sites to banking information, the accurate and safe storage of information is necessary in all aspects of modern life. One method utilized for the safe storage of data in an efficient manner is RAID storage systems. RAID storage systems combine many smaller and inexpensive disks, instead of one large disk, to form logical drives. To preserve data integrity, most RAID implementations include redundancy in order to protect the valuable information that may be included on the system. However, this redundancy may result in increased overhead, such as the consumption of valuable system resources and time, needed to perform functions, such as saving data.

For example, one of the most popular RAID systems is RAID 5. RAID 5 stripes both data and parity information across a plurality of drives utilizing a distributed parity process. In this way, both data and parity blocks are distributed across the drives in the array. However, the writing of data to such an array may be resource and time intensive, thereby resulting in diminished effectiveness. For instance, in order to modify a stored block of data, a controller of a RAID 5 system must engage in a long process in order to insure data integrity that includes reading existing blocks, removing data knowledge of the changed block from the parity block, calculating new parity, and updating the data block and the parity block. This process may require a significant amount of system resources and time in order to accomplish.

Therefore, it would be desirable to provide an improved system and method for increasing RAID system effectiveness.

SUMMARY OF THE INVENTION

Accordingly, the present invention is directed to a simple and scalable RAID XOR assist logic with overlapped operations. In a first aspect of the present invention, an apparatus suitable for performing overlapped operations includes an exclusive OR (XOR) unit suitable for performing an exclusive OR (XOR) operation. A memory communicatively coupled to the XOR unit, wherein the memory is suitable for storing a first item of data and a second item of data thereby enabling overlapped operations of the exclusive OR (XOR) unit.

In a second aspect of the present invention, a RAID system includes an exclusive OR (XOR) unit suitable for performing an exclusive OR (XOR) operation and a memory communicatively coupled to the XOR unit. The memory is suitable for storing a first item of data and a second item of data thereby enabling overlapped operation of the exclusive OR (XOR) unit. An array of disk drives is communicatively coupled to the exclusive OR (XOR) unit.

In a third aspect of the present invention, a method of generating parity utilizing an overlapped function in a RAID array includes receiving an old data set from a data storage array and loading the data to a memory device coupled to an exclusive OR (XOR) unit. Old parity is received from the data storage array, and the old parity is processed through the exclusive OR (XOR) unit with the old data set from the memory device to remove knowledge of the old data set from the old parity. The resultant intermediate parity is stored to the memory device. New parity is generated by reading the new data set and intermediate parity from the memory device processed through the exclusive OR (XOR) unit.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
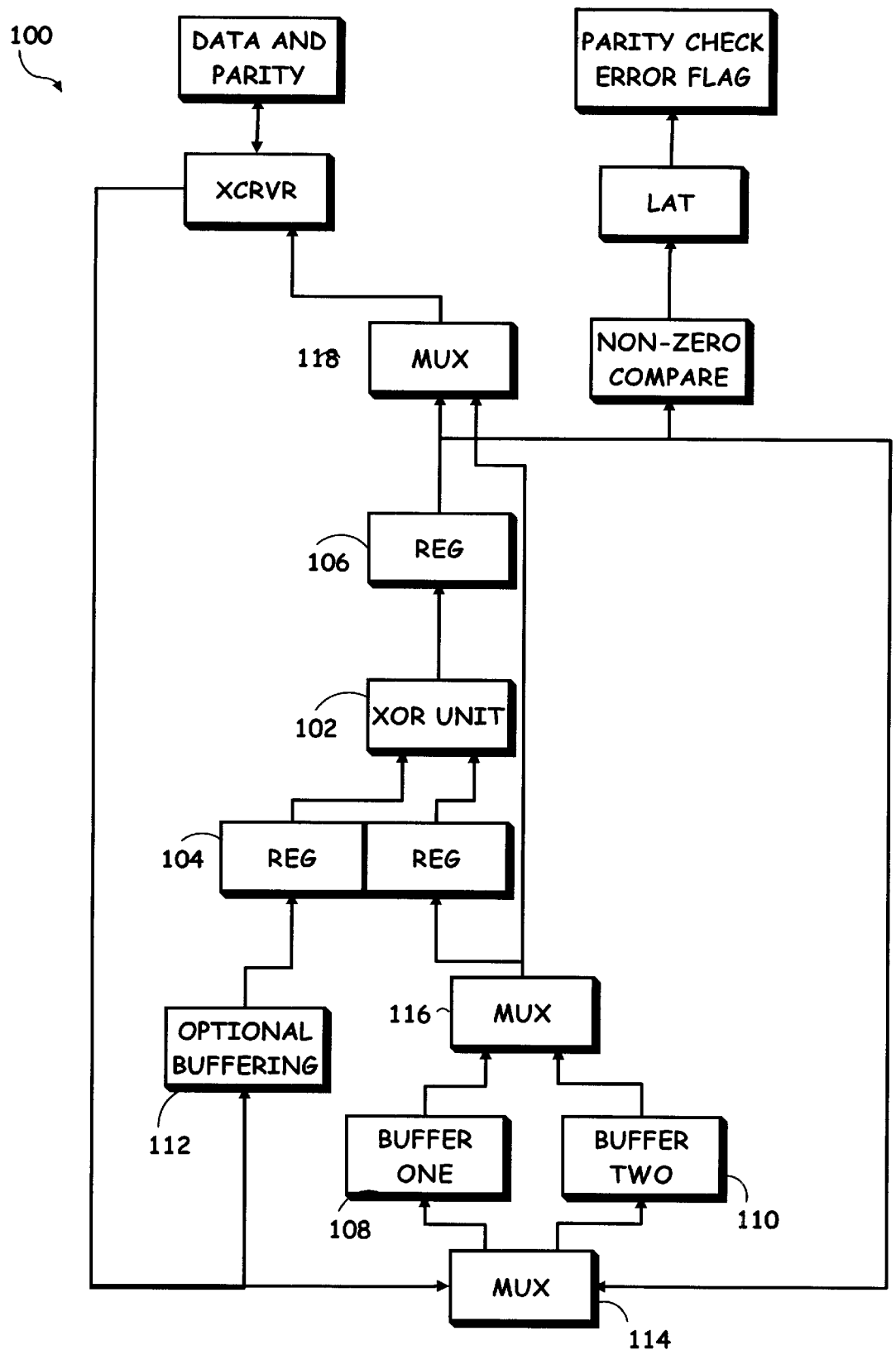
FIG. 1 is a block diagram of an exemplary embodiment of the present invention wherein two rotating buffers are utilized to perform an overlapped RAID operation.
Figure 2:
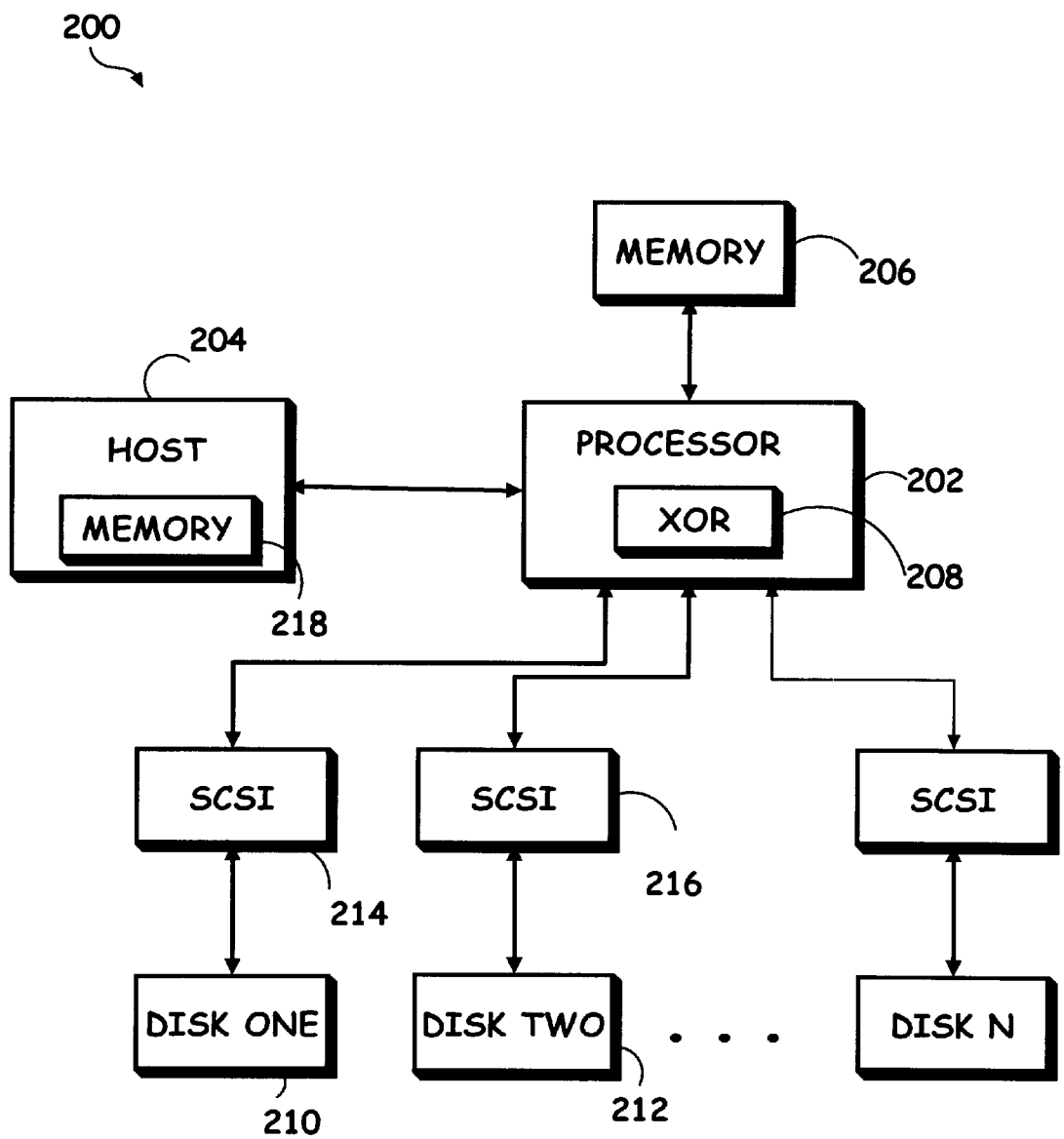
FIG. 2 is a block diagram of an exemplary embodiment of the present invention wherein a system operable to employ the present invention is illustrated.
Figure 3:
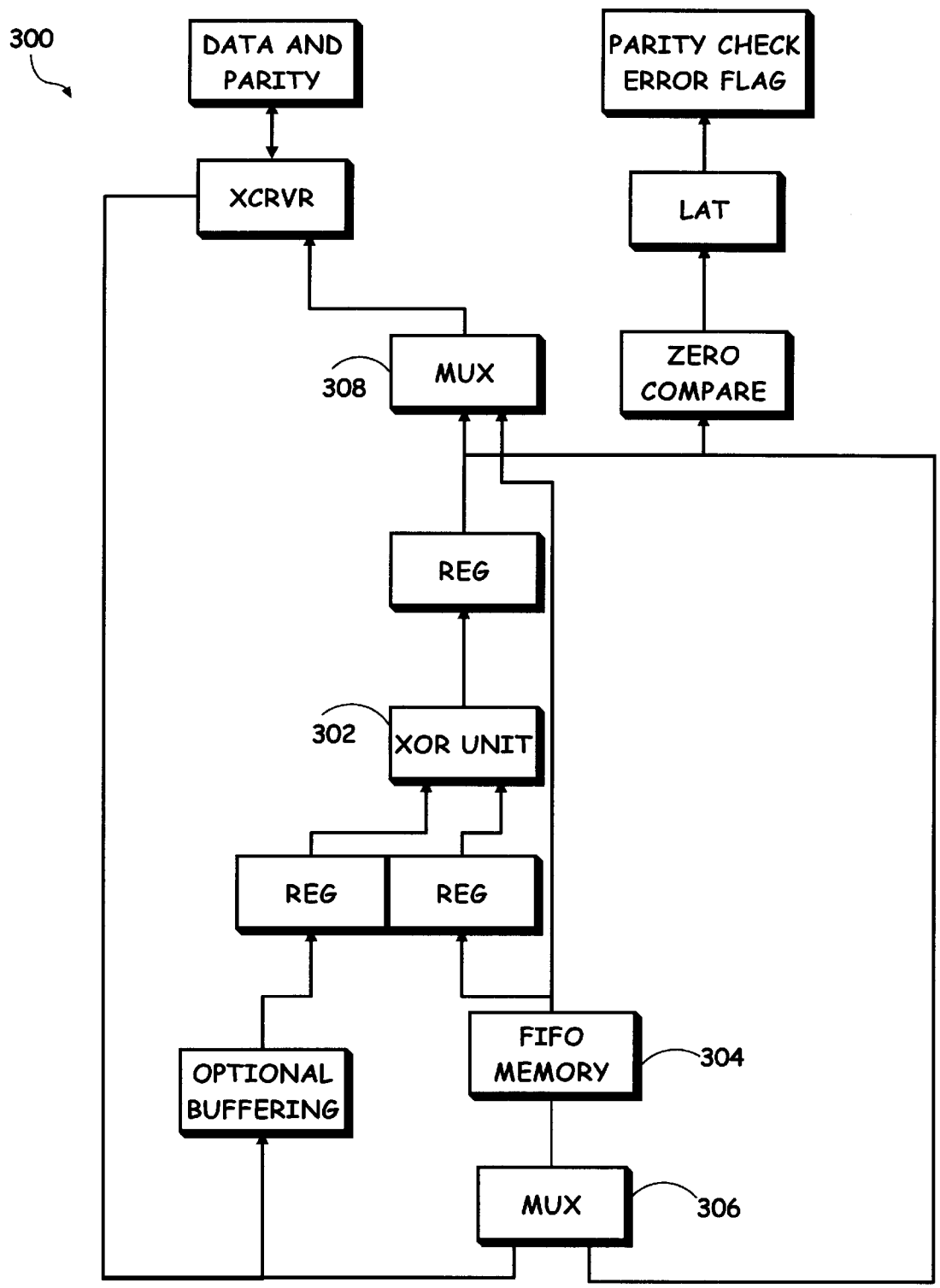
FIG. 3 is a block diagram of an exemplary embodiment of the present invention wherein a memory suitable for overlapped operations of the present invention is configured as a single FIFO memory.

Referring generally now to FIGS. 1 through 3, exemplary embodiments of the present invention are shown. RAID 5 reads may be performed like a typical read, wherein data is accessed on a disk depending on the algorithm utilized to determine how the data is distributed. However, modification and writing of a block is significantly more resource intensive. Typically, a block that needs modification must be read and the parity block corresponding to the data block is read. Knowledge of the data block is removed from the parity block, and then new parity is calculated. The data block and the parity block is then updated. The present invention provides a simple XOR unit that is expandable, capable of overlapped operations, multiplicatable and scalable. More than one XOR assist of the present invention may operate in parallel to provide improved efficiency and performance.

For example, to perform a write function, new data must be obtained from a main memory of a host, and old data and old parity retrieved from a disk array. An exclusive OR (XOR) operation is performed on the old data and old parity to give intermediate parity, i.e. old parity with knowledge of the old data removed from it. The new data with the intermediate parity is run through an XOR operation to create new parity. The new data and the new parity are then written back to the disk array. Thus, instead of writing the new data out, and then performing an exclusive OR (XOR) operation on all of the data, the old data and the old parity are run through an XOR operation. That data is stored and run through an XOR operation with the new data. The resulting data reincorporated the new data and then written out to the disks.

Referring now to FIG. 1, an exemplary embodiment 100 of the present invention is shown wherein two rotating buffers are utilized to perform an overlapped RAID operation. A XOR unit 102, such as a unit suitable for use in a RAID 5 or other RAID configuration requiring XOR operations, is set with a register before 104 and a register behind 106 in order to perform pipelined operations, i.e. overlapped operations within each clock cycle. A first buffer 108 and a second buffer 110 are also included in order to provide overlapped XOR operations. It may also be preferable to include optional buffering 112 so that if there is a speed difference between an external bus speed and the unit, the operation of the unit will not affect the external bus.

To begin a write operation utilizing the architecture of the present invention, old data that is to be modified/replaced is brought in from a disk drive and loaded to a first buffer 108. For example, data may be read in and loaded directly to the first buffer 108 through multiplexer 114.

Old parity is then brought to the XOR unit 102 from a disk drive, clocked through the XOR unit 102, read through an exclusive OR (XOR) operation, and loaded to a second buffer 110. Thus, the second buffer is loaded with intermediate parity. In this way, the old data is read from the first buffer in conjunction with the old parity, the old parity is transferred from the disk drive, an XOR operation is performed on the old parity and the result is written to the second buffer 110 as old parity minus old data. In other words, knowledge of the data block is removed from the parity block. At this point, the first buffer 108 includes old data and the second buffer includes intermediate parity, i.e. old parity minus old data.

Since the old data is to be replaced with the new data, parity must match the new data to insure data integrity. Therefore, new parity must be generated. New data is read at the same time the second buffer 110 containing the intermediate parity is read, so that the output is stored in the first buffer 108 replacing the old data with the new parity. The new parity is then diverted around the XOR unit 102 through the multiplexer 118 and may be saved in a memory location and stored for writing, transferred to a disk with the new data and the like.

Referring now to FIG. 2, an exemplary embodiment of the present invention is shown wherein a system operable to employ the present invention is illustrated. A RAID system 200 may include a processor 202 suitable for performing a program of instructions. The processor 202 is coupled to a host 204, such as an information handling system and the like. The processor 202 is also coupled to local memory 206, such as double data rate memory and the like, suitable for storing a program of instructions and data for quick access by the processor 202. The processor 202 includes an XOR unit 208 suitable for performing exclusive OR (XOR) operations. A plurality of disks, such as disk one 210, disk two 212 to disk N configured in an array, are connected to the processor 202 with the use of controllers, in this instance SCSI controllers 214 and 216.

The processor 202 receives new data from the host 204 and transfers the data to memory 206 local to the processor 202. Old data and parity is read from the disk drives, in this instance disk one 210 and disk two 212, by locating blocks of data utilizing an algorithm, and read into memory 206. Thus, the memory 206 includes new data, old data and old parity. The processor 202 utilizes the XOR unit 208 to perform the desired data modification operations. The XOR unit 208 may be automated, such as a state machine, may be monitored by the processor 202, and the like as contemplated by a person of ordinary skill in the art. For example, the processor may communicate to the state machine how large a segment needs to have an XOR operation performed and also include a pointers to local memory 206 where the respective data is stored or is to be stored. The state machine may then step through the desired operations in an overlapped manner.

LOCAL MEMORY OPERATIONS

Read

For example, a read request may be performed wherein data is read from a SCSI device to local memory. The data may then be written from the local memory to host memory. Therefore, as stated before, a read operation may be performed with little overhead and system resources. Additionally, a bypass mode may be implemented wherein information is transferred directly from the SCSI device to the host bypassing the data copy operation in local memory.

| Read | Host Memory Xfer | Local Memory Xfer | SCSI Xfer | XOR Xfer | Comments |
|---|---|---|---|---|---|
| 1. Read Data | | 1 | 1 | | SCSI → Local Memory |
| 2. Write Data | 1 | 1 | — | — | Local Memory → |
| Totals | 1 | 2 | 1 | 0 | Host Memory (NOTE: Potential higher performance bypass mode: SCSI → Host Memory) |

Write

A write command may involve a significant outlay of resources. By utilizing the present invention, a write command may be performed in an overlapped and efficient manner. Old data is read from the SCSI device to local memory, parity is read from the SCSI device to local memory, and new data is read from a host, over a PCI bus, to local memory. The old data is diverted around the XOR unit 114 and stored in one of the XOR memories. The old parity is processed through the XOR unit from local memory in order to remove knowledge of the old data block, to obtain intermediate parity. The new data is passed from local memory and processed with the intermediate parity through the XOR unit and then the result is written to local memory. New data and new parity are then written from local memory to the SCSI device(s). Size of buffers and/or local memory may require that the RAID XOR operation be performed in stages. For example, if a 64 k write was requested, but a 4 k buffer was provided, a plurality of passes utilizing the present invention may be necessary to complete the operation.

| Write | Host Memory Xfer | Local Memory Xfer | SCSI Xfer | XOR Xfer | Comments |
|---|---|---|---|---|---|
| 1. Read Data (Old) | | 1 | 1 | | SCSI → Local Memory |
| 2. Read Parity (Old) | | 1 | 1 | | SCSI → Local Memory |
| 3. Read Data (New) | 1 | 1 | | | Host Memory → Local Memory |
| 4. Read Data (Old) | | 1 | | 1 | Local Memory → XOR (Pass) |
| 5. Read Parity (Old) | | 1 | | 1 | Local Memory → XOR (XOR) |
| 6. Read Data (New) | | 1 | | 1 | Local Memory → XOR (XOR) |
| 7. Write Parity (New) | | 1 | | 1 | XOR (Pass) → Local Memory, Repeat Steps 4 through 7 |
| 8. Write Data (New) | | 1 | 1 | | Local Memory → SCSI |
| 9. Write Parity (New) | | 1 | 1 | | Local Memory → SCSI |
| Totals | 1 | 9 | 4 | 4 | |

Crippled Read

Although a typical read in which all the devices in an array are operational may be achieved in an efficient manner as described above, the failure of a device within an array may require the performance of a "crippled read". For example, if one disk drive, drive 4, in a RAID array fails, the RAID array may continue to operate. Therefore, a host requesting information from the failed drive will necessitate the reconstruction of data that was stored on the failed device. To accomplish this, data included in the operational devices, such as drives 1, 2 & 3, is read with the parity. An exclusive OR (XOR) operation is performed on the data with the parity, and the resultant data is temporarily stored and later transferred to the host. In RAID storage implementations, the XOR unit performs even parity generation.

| Crippled Read | Host Memory Xfer | Local Memory Xfer | SCSI Xfer | XOR Xfer | Comments |
|---|---|---|---|---|---|
| 1. Read Data-1 (Old) | | 1 | 1 | | SCSI → Local Memory |
| 2. Read Data-2 (Old) | | 1 | 1 | | SCSI → Local Memory |
| 3. Read Data-3 (Old) | | 1 | 1 | | SCSI → Local Memory |
| 4. Read Parity (Old) | | 1 | 1 | | SCSI → Local Memory |
| 5. Read Data-1 (Old) | | 1 | | 1 | Local Memory → XOR (Pass) |
| 6. Read Data-2 (Old) | | 1 | | 1 | Local Memory → XOR (XOR) |
| 7. Read Data-3 (Old) | | 1 | | 1 | Local Memory → XOR (XOR) |
| 8. Read Parity (Old) | | 1 | | 1 | Local Memory → XOR (XOR) |
| 9. Write Data (New) | | 1 | | 1 | XOR (Pass) → DDR, Repeat Steps 5 through 9 |
| 10. Write Data (New) | 1 | 1 | | | Local Memory → Host Memory |
| Totals | 1 | 10 | 4 | 5 | |

Reconstruction

Reconstruction is similar to a crippled read wherein missing data is obtained. However, in reconstruction the data is stored to a replacement device, such as a new drive that has been hot-swapped, and the like. Therefore, the difference between reconstruction and a crippled read is the destination of the data. For example, data included in the operational devices is read with the parity. An exclusive OR operation is performed on the data with the parity, and the resultant data is written out to the newly available device restoring the missing data.

| Reconstruction | Host Memory Xfer | Local Memory Xfer | SCSI Xfer | XOR Xfer | Comments |
|---|---|---|---|---|---|
| 1. Read Data-1 (Old) | | 1 | 1 | | SCSI → Local Memory |
| 2. Read Data-2 (Old) | | 1 | 1 | | SCSI → Local Memory |
| 3. Read Data-3 (Old) | | 1 | 1 | | SCSI → Local Memory |
| 4. Read Parity (Old) | | 1 | 1 | | SCSI → Local Memory |
| 5. Read Data-1 (Old) | | 1 | | 1 | Local Memory → XOR (Pass) |
| 6. Read Data-2 (Old) | | 1 | | 1 | Local Memory → XOR (XOR) |
| 7. Read Data-3 (Old) | | 1 | | 1 | Local Memory → XOR (XOR) |
| 8. Read Parity (Old) | | 1 | | 1 | Local Memory → XOR (XOR) |
| 9. Write Data (Restored) | | 1 | | 1 | XOR (Pass) → DDR, Repeat Steps 5 through 9 |
| 10. Write Data (Restored) | | 1 | 1 | | Local Memory → SCSI |
| Totals | 0 | 10 | 5 | 5 | |

RAID DATA AND PARITY INTEGRITY CHECK

The XOR unit includes non-zero compare and latch circuitry. This circuitry is used to perform a RAID data and parity integrity check. First RAID data is processed through the XOR unit. The last operation is XOR the final result of all the above operations with the RAID parity associated with the RAID data. The result of these last XOR operations should be zero. Prior to this last step of the RAID data and parity integrity check, the processor 202 enables the non-zero circuitry. If at any time the RAID integrity check fails, i.e., result was non-zero, then the parity check error flag is set and later check by processor 202.

| RAID Data and Parity Integrity Check | Host Memory Xfer | Local Memory Xfer | SCSI Xfer | XOR Xfer | Comments |
|---|---|---|---|---|---|
| 1. Read Data-1 (Old) | | 1 | 1 | | SCSI → Local Memory |
| 2. Read Data-2 (Old) | | 1 | 1 | | SCSI → Local Memory |
| 3. Read Data-3 (Old) | | 1 | 1 | | SCSI → Local memory |
| 4. Read Data-4 (Old) | | 1 | 1 | | SCSI → Local memory |
| 5. Read Parity (Old) | | 1 | 1 | | SCSI → Local Memory |
| 6. Read Data-1 (Old) | | 1 | | 1 | Local Memory → XOR (Pass) |
| 7. Read Data-2 (Old) | | 1 | | 1 | Local Memory → XOR (XOR) |
| 8. Read Data-3 (Old) | | 1 | | 1 | Local Memory → XOR (XOR) |
| 9. Read Data-4 (Old) | | 1 | | 1 | Local Memory → XOR (XOR) |
| 10. Read Parity (Old) | | 1 | | 1 | Local Memory → XOR (XOR) (NOTE: Enable non-zero XOR result check circuitry and latch) |
| Totals | 0 | 10 | 5 | 5 | |

HOST MEMORY OPERATIONS

The previously listed examples describe a system and method wherein local memory is utilized as a buffer of the present invention. Additional embodiments of the present invention are also contemplated wherein memory from other locations and devices is utilized as a buffer of the present invention. For example, host memory 218 (FIG. 2) may be configured to include buffers so that overlapped operations may be performed utilizing the host memory and PCI bus to transfer data. Such an embodiment may be preferable in certain instances to save costs by utilizing preexisting memory of a host system.

Read

A read request may be performed by transferring data from a SCSI device across a PCI bus to host memory.

| Read | Host Memory Xfer | Local Memory Xfer | SCSI Xfer | XOR Xfer | Comments |
|---|---|---|---|---|---|
| 1. Read Data | 1 | | 1 | | SCSI → Host Memory |
| | Delete this entire row | This detail adds nothing to patent | | | |
| Totals | 1 | 0 | 1 | 0 | |

Write

A write request may be processed as discussed previously by utilizing host memory. For example, old data is read from the SCSI device to the host memory and parity is read from the SCSI device to host memory. The old parity is processed through the XOR unit to remove knowledge of the old data block, so as to obtain intermediate parity, and is stored in the host memory. The new data is processed with the intermediate parity and written to the host memory. New data and new parity are then written from host memory to the SCSI device.

| Write | Host Memory Xfer | Local Memory Xfer | SCSI Xfer | XOR Xfer | Comments |
|---|---|---|---|---|---|
| 1. Read Data (Old) | 1 | | 1 | | SCSI → Host Memory |
| 2. Read Parity (Old) | 1 | | 1 | | SCSI → Host Memory |
| 3. Read Data | 1 | | | 1 | Host Memory → XOR (Pass) |
| 4. Read Parity (Old) | 1 | | | 1 | Host Memory → XOR (XOR) |
| 5. Read Data (New) | 1 | | | 1 | Host Memory → XOR (XOR) |
| 6. Write Parity (New) | 1 | | | 1 | XOR (Pass) → Host Memory, Repeat Steps 3 through 6 |
| 7. Write Data | 1 | | 1 | | Host Memory → SCSI |
| 8. Write Parity (New) | 1 | | 1 | | Host Memory → SCSI |
| Totals | 8 | 0 | 4 | 4 | |

Crippled Read

To respond to a read command when one device has failed, the data from the failed device must be reconstructed. For example, if one drive in a four-drive array fails, the old data from the operational drives 1, 2 & 3 must be read along with the parity. The old data with the parity has an exclusive OR (XOR) operation performed. The new parity is then written to the device with the new data.

| Crippled Read | Host Memory Xfer | Local Memory Xfer | SCSI Xfer | XOR Xfer | Comments |
|---|---|---|---|---|---|
| 1. Read Data-1 (Old) | 1 | | 1 | | SCSI → Host Memory |
| 2. Read Data-2 (Old) | 1 | | 1 | | SCSI → Host Memory |
| 3. Read Data-3 (Old) | 1 | | 1 | | SCSI → Host Memory |
| 4. Read Parity (Old) | 1 | | 1 | | SCSI → Host Memory |
| 5. Read Data-1 (Old) | 1 | | | 1 | Host Memory → XOR (Pass) |
| 6. Read Data-2 (Old) | 1 | | | 1 | Host Memory → XOR (XOR) |
| 7. Read Data-3 (Old) | 1 | | | 1 | Host Memory → XOR (XOR) |
| 8. Read Parity (Old) | 1 | | | 1 | Host Memory → XOR (XOR) |

-continued

| Crippled Read | Host Memory Xfer | Local Memory Xfer | SCSI Xfer | XOR Xfer | Comments |
|---|---|---|---|---|---|
| 9. Write Data (New) | 1 | | | 1 | XOR (Pass) → Host Memory, Repeat Steps 5 through 9 |
| 10. | Delete this entire row | This detail adds nothing to patent | — | — | |
| Totals | 9 | 0 | 4 | 5 | |

Reconstruction

Reconstruction of data on a device may also be accomplished utilizing host memory. For example, old data and old parity is read from a first device, a second device and a third device to recover data from a failed fourth device. The data is processed through an exclusive OR (XOR) operation and the resultant data written to a replacement device.

| Reconstruction | Host Memory Xfer | Local Memory Xfer | SCSI Xfer | XOR Xfer | Comments |
|---|---|---|---|---|---|
| 1. Read Data-1 (Old) | 1 | | 1 | | SCSI → Host Memory |
| 2. Read Data-2 (Old) | 1 | | 1 | | SCSI → Host Memory |
| 3. Read Data-3 (Old) | 1 | | 1 | | SCSI → Host Memory |
| 4. Read Parity (Old) | 1 | | 1 | | SCSI → Host Memory |
| 5. Read Data-1 (Old) | 1 | | | 1 | Host Memory → XOR (Pass) |
| 6. Read Data-2 (Old) | 1 | | | 1 | Host Memory → XOR (XOR) |
| 7. Read Data-3 (Old) | 1 | | | 1 | Host Memory → XOR (XOR) |
| 8. Read Parity (Old) | 1 | | | 1 | Host Memory → XOR (XOR) |
| 9. Write Data (Restored) | 1 | | | 1 | XOR (Pass) → Host Memory, Repeat Steps 5 through 9 |
| 10. Write Data (Restored) | 1 | — | 1 | — | Host Memory → SCSI |
| Totals | 10 | 0 | 5 | 5 | |

Raid Data and Parity Integrity Check

The XOR unit includes non-zero compare and latch circuitry. This circuitry is used to perform a RAID data and parity integrity check. First RAID data is processed through the XOR unit. The last operation is XOR the final result of all the above operations with the RAID parity associated with the RAID data. The result of these last XOR operations should be zero. Prior to this last step of the RAID data and parity integrity check, the processor 202 enables the non-zero circuitry. If at any time the RAID integrity check fails, i.e., result was non-zero, then the parity check error flag is set and later check by processor 202.

| RAID Data and Parity Integrity Check | Host Memory Xfer | Local Memory Xfer | SCSI Xfer | XOR Xfer | Comments |
|---|---|---|---|---|---|
| 1. Read Data-1 (Old) | 1 | | 1 | | SCSI → Host Memory |
| 2. Read Data-2 (Old) | 1 | | 1 | | SCSI → Host Memory |
| 3. Read Data-3 (Old) | 1 | | 1 | | SCSI → Host Memory |
| 4. Read Data-4 (Old) | 1 | | 1 | | SCSI → Host Memory |
| 5. Read Parity (Old) | 1 | | 1 | | SCSI → Host Memory |
| 6. Read Data-1 (Old) | 1 | | | 1 | Host Memory → XOR (Pass) |
| 7. Read Data-2 (Old) | 1 | | | 1 | Host Memory → XOR (XOR) |
| 8. Read Data-3 (Old) | 1 | | | 1 | Host Memory → XOR (XOR) |
| 9. Read Data-4 (Old) | 1 | | | 1 | Host Memory → XOR (XOR) |
| 10. Read Parity (Old) | 1 | — | — | 1 | Host Memory → XOR (XOR) (NOTE: Enable non-zero XOR result check circuitry and latch) |
| Totals | 10 | 0 | 5 | 5 | |

Referring now to FIG. 3, an exemplary embodiment 300 of the present invention is shown wherein a buffer suitable for overlapped operations is configured as a single FIFO memory. Data is read from a bottom of a FIFO memory while data is simultaneously written to the top of the FIFO memory. These read and write FIFO operations closely match reading data from one rotating memory while writing to an alternative rotating memory as described previously. For example, a XOR unit 302, such as a unit suitable for use in a RAID 5, is shown. A first-in/first-out (FIFO) memory 304 is also provided that is suitable for providing an architecture of the present invention.

To begin a write operation utilizing the architecture of the present invention, old data that is to be modified/replaced is brought in and loaded to the FIFO memory 304. For example, data is read in from a disk drive and passes through multiplexer 306 to the FIFO memory 304 so that the FIFO memory contains the old data.

Old parity is then brought to the XOR unit 302 from a disk drive, clocked through the XOR unit 302, read through an exclusive OR (XOR) operation of the XOR unit 302, and loaded to the FIFO memory 304. Thus, the FIFO memory 304 is loaded with intermediate parity. In this way, old data is read from the FIFO memory 304, and old parity is transferred from the disk drive, an XOR operation is performed on the old parity and the result is written to FIFO memory 304 as old parity minus old data. In other words, knowledge of the data block is removed from the parity block. At this point, the FIFO memory 304 holds intermediate parity, i.e. old parity minus old data.

Since the old data is to be replaced with the new data, and therefore the parity must match, new parity must be generated. New data and intermediate parity is read from the FIFO memory 304, so that the output is stored in the FIFO memory 304 replacing the intermediate parity with the new parity. The new parity is then diverted around the XOR unit 302 through multiplexer 308 and saved in a memory location and stored for writing, or the new parity is transferred to a disk with the new data. It should be appreciated that a variety of bus widths are contemplated by the present invention. Further, although the use of SCSI and RAID 5 is disclosed, a variety of bus architectures and standards are contemplated by the present invention without departing from the spirit and scope thereof.

Although a RAID 5 system is described, it should be apparent that a variety of standards are contemplated by the present invention. In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the simple and scalable RAID XOR assist logic with overlapped operations of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An apparatus suitable for performing overlapped operations, comprising:
    an exclusive OR (XOR) unit, including a first input and a first output, the XOR unit suitable for performing an exclusive OR (XOR) operation;
    a memory, including a first buffer and a second buffer, communicatively coupled to the XOR unit, the memory is suitable for storing a first item of data and a second item of data; and
    a first register set before the XOR unit and communicatively coupled with the first input of the XOR unit and the memory and a second register set behind the XOR unit and communicatively coupled with the first output of the XOR unit and the memory, the first register and the second register being used for performing overlapped operations of the exclusive OR (XOR) unit.

2. The apparatus as described in claim 1, wherein the first buffer and the second buffer enable rotating operations.

3. The apparatus as described in claim 1, wherein the memory includes a FIFO memory.

4. The apparatus as described in claim 1, wherein the first item of data includes at least one of old data and new data; and the second item of data includes at least one of old parity and intermediate parity.

5. The apparatus as described in claim 1, wherein the overlapped operation includes at least one of a read, write, crippled read, reconstruction and RAID data and parity integrity check.

6. The apparatus as described in claim 1, wherein the memory includes at least one of local memory coupled to the exclusive OR (XOR) unit and memory included on a host system.

7. The apparatus as described in claim 1, wherein the exclusive OR (XOR) unit and memory are suitable for operating in a manner corresponding to a RAID 5 standard.

8. The apparatus as described in claim 1, wherein the exclusive OR (XOR) unit is at least one of a state machine and monitored by a processor.

9. The apparatus as described in claim 1, wherein a multiplexer is disposed to enable a bypass of the XOR unit so as to enable the memory to be loaded, the memory including at least one of a first buffer and a second buffer and a FIFO.

10. The apparatus as described in claim 1, wherein a multiplexer is disposed to enable a bypass of the XOR unit so as to enable data to be transferred from the memory back to a host, the memory including at least one of a first buffer and a second buffer and a FIFO.

11. A RAID system, comprising:
    an exclusive OR (XOR) unit, including a first input and a first output, the XOR unit suitable for performing an exclusive OR (XOR) operation;
    a memory, including a first buffer and a second buffer, communicatively coupled to the XOR unit, the memory is suitable for storing a first item of data and a second item of data;
    a first register set before the XOR unit and communicatively coupled with the first input of the XOR unit and the memory and a second register set behind the XOR unit and communicatively coupled with the first output of the XOR unit and the memory, the first register and the second register being used for performing overlapped operations of the exclusive OR (XOR) unit; and
    an array of disk drives communicatively coupled to the exclusive OR (XOR) unit.

12. The apparatus as described in claim 11, wherein the first buffer and the second buffer enable rotating operations.

13. The system as described in claim 11, wherein the memory includes a FIFO memory.

14. The system as described in claim 11, wherein the overlapped operation includes at least one of a read, write, crippled read reconstruction and RAID data and parity integrity check.

15. The system as described in claim 11, wherein the first item of data includes at least one of old data and new data; and the second item of data includes at least one of old parity and intermediate parity.

16. The system as described in claim 11, wherein the memory includes at least one of local memory coupled to the exclusive OR (XOR) unit and memory included on a host system.

17. The system as described in claim 11, wherein the exclusive OR (XOR) unit and memory are suitable for operating in a manner corresponding to a RAID 5 standard.

18. The system as described in claim 11, wherein the exclusive OR (XOR) unit is at least one of a state machine and monitored by a processor.

19. The system as described in claim 11, wherein a multiplexer is disposed to enable a bypass of the XOR unit so as to enable the memory to be loaded, the memory including at least one of a first buffer and a second buffer and a FIFO.

20. The system as described in claim 11, wherein a multiplexer is disposed to enable a bypass of the XOR unit so as to enable data to be transferred from the memory back to a host, the memory including at least one of a first buffer and a second buffer and a FIFO.

21. A method of generating parity utilizing an overlapped function in a RAID array, comprising:

receiving an old data set from a data storage array and loading the data to a memory device coupled to an exlcusive OR (XOR) unit, a first register set before the XOR unit, and a second register set behind the XOR unit;

receiving old parity from the data storage array, processing the old parity through the exclusive OR (XOR) unit with the old data set from the memory device to remove knowledge of the old data set from the old parity, and storing resultant intermediate parity to the memory device; and generating new parity, wherein the new parity is generated by reading a new data set and intermediate parity from the memory device through the exclusive OR (XOR) unit.

22. The method as described in claim 21, wherein the memory device includes a first buffer and a second buffer, wherein the first buffer is utilized to store the old data set and the generated new parity and the second buffer is utilized to store old parity.

23. The method as described in claim 21, wherein the memory device includes a FIFO memory.

* * * * *